April 18, 1961   E. J. RUOF   2,980,369
ANTI-SKID SYSTEM-ELECTRIC CIRCUIT
Filed April 7, 1959

INVENTOR.
EDGAR J. RUOF

BY
J. B. Holden
ATTORNEY

United States Patent Office 2,980,369
Patented Apr. 18, 1961

2,980,369
ANTI-SKID SYSTEM ELECTRIC CIRCUIT

Edgar J. Ruof, Akron, Ohio, assignor to The Goodyear Tire & Rubber Company, Akron, Ohio, a corporation of Ohio Filed Apr. 7, 1959, Ser. No. 804,688

15 Claims. (Cl. 244—111)

The present invention relates to control circuits for anti-skid systems, and especially to a novel and improved control system for positively removing brake pressure when a braked wheel is approaching skidding conditions, or reaches skid conditions.

Heretofore there has been quite a bit of work done in the development of several different types of anti-skid control systems, and one of such systems that has been successfully used is that system shown in Patent No. 2,799,462.

These anti-skid systems are used in most instances in aircraft and obviously then the weight, as well as the cost and size factors of the operative control system become very important.

It is the general object of the present invention to provide a novel and improved anti-skid control system characterized by the compact size and the low weight of the components of the system.

Another object of the invention is to provide a novel and improved anti-skid control system using capacitors and transistors as the main operative components thereof.

A further object of the invention is to apply novel controls to previous types of anti-skid systems using D.C. generators driven at speeds proportional to the braked wheel speeds therein.

Another object of the invention is to provide a sensitivity resistor connected to carry a discharge of electrical energy stored upon a reference voltage capacitor in an anti-skid control system when unusual electrical conditions are established on the capacitor, as when skid conditions are established, so that the voltage across the sensitivity resistor can be used for actuating brake control means.

Another object of the invention is to provide a pair of transistors connected in an electric control system or circuit of the type described and to withdraw a sensitivity resistor from the discharge circuit of a reference voltage capacitor and to use the discharge circuit for controlling brake action when skid conditions develop.

The foregoing and other objects and advantages of the invention will be made more apparent as the specification proceeds.

Figure 1:
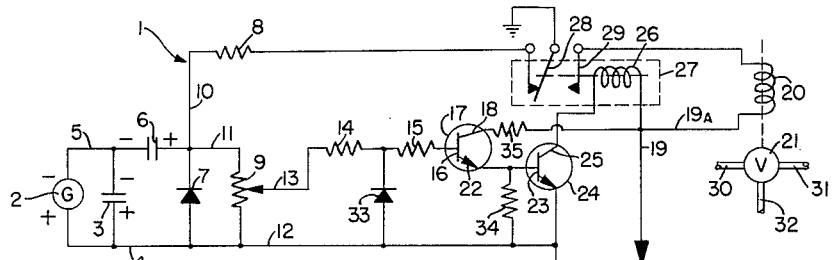
Figure 2:
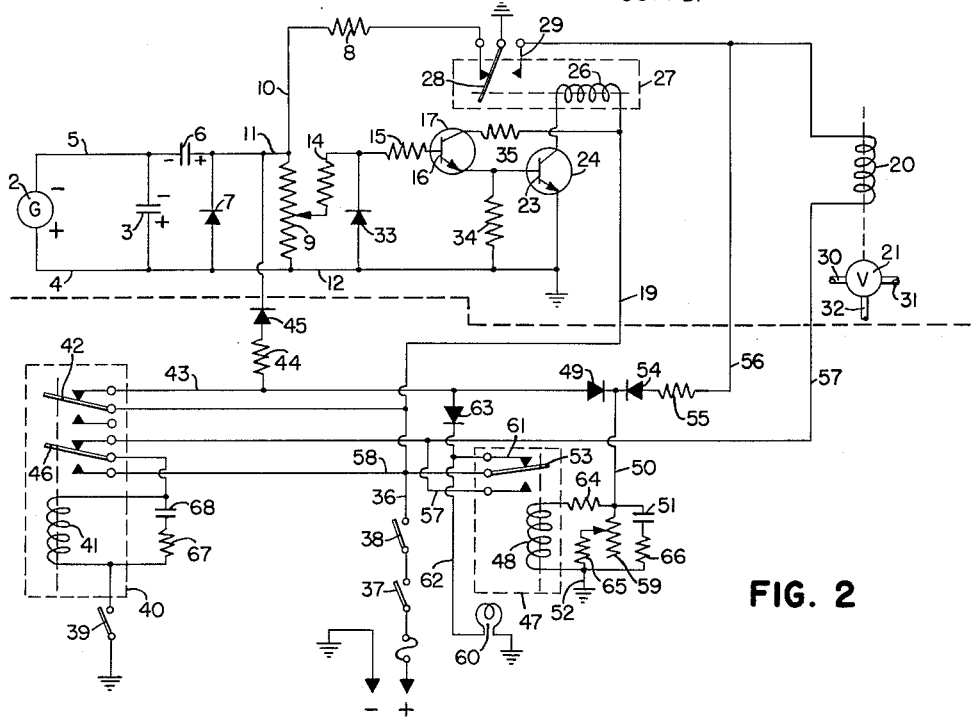

Reference now should be had to the accompanying drawings, wherein:

Fig. 1 is an electrical circuit diagram of an anti-skid control system embodying the principles of the invention; and Fig. 2 is an electric circuit diagram of a more comprehensive electric circuit of the anti-skid control system of the invention and wherein touch down and fail-safe control means are provided in the control system.

When referring to corresponding members shown in the drawings and referred to in the specification, corresponding numerals are used to facilitate comparison therebetween.

Reference now is made to the particular circuit diagram shown in Fig. 1 and the anti-skid system is indicated as a whole by the numeral 1. This anti-skid system 1 is designed for use with means such as is shown in previously referred to Patent No. 2,799,462 and where a D.C. generator 2 is provided and is adapted to be driven by a vehicle wheel at a speed proportionate thereto. Thus the voltage output of the generator 2 is a measure of wheel velocity and variations in the wheel speed are immediately and proportionately indicated by the voltage output of the generator. This generator 2 has a filter capacitor 3 connected across the output leads 4 and 5 of the generator with the positive voltage output lead of the generator being the lead 4 as shown. The negative lead 5 from the generator 2 connects to a reference voltage capacitor 6, as well as to the filter capacitor 3, while a suitable diode rectifier 7 is connected between the positively charged plate of the capacitor 6 and the positive side of the generator 2. This permits current flow from the generator 2 through diode 7 substantially only in the direction to charge the capacitor 6 and discharge flow from the capacitor 6 to the control circuits upon slow down of the generator 2, as hereinafter described.

Any electrical charge on the positive plate of the reference voltage capacitor 6 can discharge through parallel discharge paths provided by sensitivity resistors 8 and 9 which connect by leads 10 and 11, respectively, to such capacitor 6 and from such resistors, current flows to ground. The resistor, or potentiometer 9 connects to a common lead 12 that is grounded.

A potentiometer lead 13 connects to the lead 11 at some desired point in the resistance 9 to measure voltage drop thereacross, and suitable resistors 14 and 15 are provided in series in such lead 13. The resistor 15 connects to a base 16 of a transistor 17. A collector lead 18 of the transistor 17 connects to a suitable power supply lead 19, such as a 24 volt D.C. battery, and from it the lead 19a extends to an operating coil 20 for a solenoid valve 21. An emitter lead 22 from the transistor 17 is connected to a base 23 of a second transistor 24. Thus an amplified signal can be obtained from the transistor 24 for transmission through a collector lead 25 thereof that connects to an operating coil 26 of a conventional relay 27. When actuated, the coil 26 causes the relay 27 to pull a contact arm 28 over to engage a second contact, or contact arm 29 to close a circuit through the operating coil 20 of the solenoid valve 21. Thus the transistor 17 as amplified through the transistor 24 actuates the relay 27 to close an operating circuit for the solenoid valve 21. When the solenoid valve 21 is actuated, the solenoid valve 21 blocks further flow of hydraulic brake pressure fluid to the brake from the supply conduit 30. When actuated, the solenoid valve 21 also connects a conduit 32 that extends to the brake to a return conduit 31 extending to the fluid reservoir.

It is seen that when a wheel to which the generator 2 is connected touches down on aircraft landing, for example, the generator voltage becomes maximum as soon as the wheel spins up to aircraft speed, and the reference voltage capacitor 6 quickly is charged to the output voltage of the generator. The capacitor 6 then can only discharge through either the resistance 8 and/or the resistance 9 and, as long as no skid action occurs or is being approached, the capacitor 6 slowly discharges through the resistances 8 and 9 and the voltage on such capacitor 6 closely follows that generated in the generator 2.

When a skid occurs, the generator voltage suddenly drops and the reference voltage capacitor 6 rapidly tries to drop to the same voltage as that of the generator. This sends more current through the resistances 8 and 9 and, when a predetermined voltage is established across the resistance 9, the amplifying action of the transistors 17 and 24 will cause actuation of the relay 27 and the operating coil 20 of the solenoid valve 21 to remove braking action.

When the relay 27 is energized, it will be seen that the resistance 8 is cut from the discharge circuit of the capacitor 6 and that the capacitor 6 must discharge through the resistance 9 and/or through the resistances 14 and 15 and the transistors 17 and 24. Such voltage discharge occurs relatively slowly during the circuit conditions then established.

As the wheel spins up to aircraft speed by removal of the brake pressure and the avoidance of skid conditions, the generator 2 will regain a voltage representative of the speed of the aircraft. As soon as the generator voltage reaches the voltage of the capacitor 6, the current flow through the resistance 9 drops to such a low value as to cause the relay 27 to drop out or open, and the circuit of the operating coil 20 for the solenoid valve 21 is opened so that braking conditions would be re-established and the solenoid valve 21 is returned to a braking circuit condition.

Preferably a voltage regulator 33 is connected between ground and the resistances 14 and 15, while a calibration resistance 34 may be connected across the transistor 24, if desired. One additional control or calibration resistance 35 is also connected in the circuit for the collector 18 of the transistor 17.

*Comprehensive control*

Now referring to the circuits shown in Fig. 2, the same components as have been described hereinbefore with reference to Fig. 1 are included and are referred to by the same numbers. However, the circuitry shown in Fig. 2 has several additional control functions from the simplified circuit of Fig. 1.

*Power supply*

In Fig. 2, power supply is provided by a lead 36 that connects to a suitable D.C. supply, such as a 24 volt battery (not shown) and with such lead 36 having control switches 37 and 38 provided therein. Usually the switch 37 is a manually controlled switch in the cockpit of the aircraft in which the anti-skid control system or apparatus is positioned. The switch 38 is controlled, for example, by the landing gear handle or equivalent member and is closed whenever the handle or other control is set so as to put the landing gear in its down, or operative position.

A further control switch 39 is provided in the apparatus of Fig. 2 and such switch 39 is positioned directly on a landing gear strut, for example, as in the apparatus and control shown in Patent No. 2,799,462, and with such switch 39 being closed readily by initial compression of the aircraft strut on which such switch is positioned. Hence any load applied to the aircraft strut will close the switch 39. The switch 39 is shown in its open position and it controls a relay 40 by means of a relay operating coil 41. When the relay 40 is open and the switches 37 and 38 are closed, the D.C. power supply, such as 24 volts, is transmitted to the resistance 9 for brake release action. Such circuit from power lead 36 includes a contact 42, controlled by the relay 40, that connects to a lead 43 that extends to a resistance 44 and through a suitable rectifier 45 to the lead 11, which supplies the D.C. input power to the sensitivity resistor 9. Such voltage applied across the sensitivity resistor 9 thus actuates the circuit components shown in Fig. 1, and repeated in Fig. 2, as hereinbefore described for brake release action. The relay 40 and associated means holds the brakes inoperative during any time when the aircraft strut would bounce off of the landing field, for example, and prior to touch down of the aircraft support strut.

The relay 40 also controls a contact 46, as hereinafter described.

*Fail-safe protection*

An additional safety feature that is desirable in apparatus of this type is that the pilot be given complete control of braking action in the event of malfunction of any components of the system such as would hold brake pressure off for a continuous period of, for example, about 3½ seconds, or longer.

When the switches 37 and 38 are closed, power also is supplied to an additional control relay 47 by closing a circuit to an operating coil 48 therefor. Such relay 47 is energized by power from the lead 36 which supplies power to the lead 43 through contact 42, when the switch 39 is open before strut compression, and energy flows from such lead 43 through a suitable rectifier 49 and to a lead 50 that connects to the operating coil 48, as described hereinafter in more detail. Power supply to the lead 50 charges a suitable condenser 51 that is connected in parallel with the operating coil 48 and through a lead to a ground 52.

When the aircraft support strut touches down, and the switch 42 is opened by energization of the relay 40, the energization of the previously energized relay 47 is continued through a different circuit including a contact 53 controlled by the relay 47. Power flows to the relay 47 from the lead 50 through a suitable rectifier 54 that connects through a control resistance 55 and a lead 56 to the operating coil 20. From such operating coil 20 current flows through a lead 57 to which the contact 53 is connected when the relay 47 is actuated so that it will connect the lead 57 to a lead 58 that in turn connects to the power supply lead 36.

The relay 47, condenser 51 and associated resistance means are so calibrated that the relay 47 will remain energized for any desired period, such as approximately 3.5 seconds, until the potential stored on the condenser 51 gradually flows or leaks therefrom through the operating coil 48 and resistances provided in the ground circuit.

When there is no anti-skid action in the control circuit by the solenoid valve 21, the coil 20 has power supplied thereto but no operative circuit is formed through such coil 20. In such condition, the relay 47 is continually energized by the circuit previously described. When anti-skid action by energization of the relay 27 occurs, the contact arm 29 and the junction lead by which it connects to the coil 20 drop to ground potential. If for some malfunction of the control circuit the circuit of the operating coil 20 remains operative for some time, after the discharge of the condenser 51, as in about 3.5 seconds, the power supply to the solenoid valve operating coil 20 is opened by breaking the connection of contact 53 with the lead 57, and brake action is restored.

Should the coil 20 de-energize after less than 3.5 seconds, the condenser 51 is immediately recharged through the lead 58, contact 53, lead 57, coil 20, lead 56, resistance 55, rectifier 54 and the lead 50. Hence the relay 47 will remain energized continuously as long as no anti-skid action occurs. Energization of the relay 27 for longer than 3.5 seconds, and consequent brake action release, results in de-energization of the relay 47 and return of braking control action to the pilot or driver of the vehicle to which the control of the invention is secured.

A variable resistance, or potentiometer 59 is provided in parallel with the condenser 51 to aid in calibrating and controlling the discharge time for such condenser.

The relay 40 is energized through the contact 53 and lead 57 when the strut switch 39 is closed and the relay 47 has been actuated; and the relay 40 then connects the contact 46 to the lead 58. Power thus flows through the lead 58 and contact 46 to maintain energization of the relay operating coil 41 as long the switch 39 is closed.

A check light 60 is connected between ground and a contact 61. The contact 61 engages the contact 53 when the relay 47 is de-energized. A lead 62 connects to such check light 60 and also through a rectifier 63 to the lead 43. Thus if either the relay 47, or the relay 40 is de-energized, such check light 60 comes on to indicate some malfunction in the control system as both the relays 40 and 47 should be energized when the control system is functioning properly and the aircraft is on the ground.

A further feature of the control system of the invention is that the relay 47 can be re-energized by simply turning the switch 37 off and then on again.

The rectifiers 7, 33, 45 etc. used in the control circuits of the invention will, of course, pass current only in one direction, as indicated in the drawing.

The power requirements for the solenoid valve 21 and its operating coil 20 determine the characteristics required for the control relay 27. The control relay 27 should be a fast acting relay and should not require high coil power. A micro-miniature two pole double throw relay with 550 ohms D.C. resistance and a pull-in of about 12 volts has performed quite well. The D.C. generator 2 has an output at 1000 r.p.m. of 30 volts and has 500 ohms maximum D.C. resistance. The rectifiers used in the control apparatus or circuit are all diode rectifiers of the type having a peak inverse voltage rating of 225 volts and a current rating of 400 mils at 25° C.

The control circuit of Fig. 2 is completed by resistances 64, 65 and 66 that are connected, respectively, in series with the operating coil 48, the potentiometer 59 and the condenser 51. A resistance 67 and a condenser 68 are connected in series with each other and in parallel with the operating coil 41 for the control relay 40.

Other typical elements for use in the control circuit or circuits of the invention are as follows:

| Control circuit element: | Characteristics |
|---|---|
| Capacitor 3 | 10 mfd., 100 v. D. C. |
| Capacitor 6 | 25 mfd., 100 v. D.C. |
| Capacitor 51 | 100 mfd., 50 v. D. C. |
| Capacitor 68 | 4 mfd., 50 v. D. C. |
| Relay 47 | 12000 ohms D.C. resistance. |
| Solenoid valve 21 | Either one 24 v. valve or two 12 v. valves in series. |
| Transistor 17 | Collector Current 25 mils. Breakdown voltage 45 volts. Large signal current gain 76 to 333. |
| Transistor 24 | Collector current 60 mils. Breakdown voltage 60 volts. Large signal current gain 28 to 90. |
| Potentiometer 9 | 100000 ohms. |
| Resistor 14 | 50000 ohms, ±10% ½ watt. |
| Resistor 15 | 5000 ohms, ±10% ½ watt. |
| Resistor 8 | 3900 ohms, ±10% ½ watt. |
| Resistor 35 | 10000 ohms, ±10% ½ watt. |
| Resistor 34 | 10000 ohms, ±10% ½ watt. |
| Resistor 55 | 1000 ohms, ±10% ½ watt. |
| Potentiometer 59 | 100000 ohms. |
| Resistor 64 | 12000 ohms, ±10% ½ watt. |
| Resistor 44 | 6200 ohms, ±10% ½ watt. |
| Resistor 67 | 10 ohms, ±10% ½ watt. |
| Resistor 66 | 30 ohms, ±10% ½ watt. |
| Resistor 65 | 3000 ohms, ±10% ½ watt. |
| Voltage regulator 33 | Zener diode, 5 volts. |

In operation, the relays 40 and 47 can be referred to as a first control relay and a second control relay, respectively, to differentiate from the relay 27. Such relays all have two positions i.e. an energized or actuated position and a released position, for controlling the contact means associated therewith. All of the relays are shown in their released or non-actuated positions.

When the switches 37, 38 and 39 are all closed, as when the aircraft on which the anti-skid system is mounted lands and the strut (not shown) on which the switch 39 is mounted is loaded to close the switch, D.C. power is no longer supplied to the capacitor 6 and sensitivity resistor 9 by the lead 43. Hence the relay 27 moves to its non-actuated position and operation of the brake is permitted.

Even though power is available to the solenoid coil 20 through series circuits with the relay operating coil 48, the potentiometer 59 and/or resistance 66 when the relay 47 is energized, only a very small current is permitted to flow at such time and the solenoid valve 21 is not actuated thereby. As previously indicated, the potentiometer 59 and resistance 66 have high resistance. Likewise the operating coil 48 has a high resistance of, for example, ten or twelve thousand ohms while the solenoid operating coil 20 has a resistance, for example, of only about 30 ohms.

From the foregoing, it will be seen that an improved, compact anti-skid control has been provided and that the objects of the invention have been achieved.

While a certain representative embodiment and details have been shown for the purpose of illustrating the invention, it will be apparent to those skilled in this art that various changes and modifications may be made therein departing from the spirit or scope of the invention.

What is claimed is:

1. In an anti-skid system for use with a vehicle where a D.C. generator is provided driven to a speed proportional to the speed of a vehicle wheel, the combination comprising a reference voltage capacitor one terminal of which connects to said generator, rectifier means connecting the generator to the opposite terminal of said reference voltage capacitor for charging current flow thereto, a resistor connecting said reference voltage capacitor to ground, a pair of transistors connected in current amplifying relation and having a base of one transistor connected to said reference voltage capacitor, a D.C. power supply, means connecting the emitter of the other of said transistors to ground, a relay connected to the collector of said other transistor for actuation when a predetermined current flows through said other transistor, a solenoid valve, and means connecting a power circuit to said solenoid valve when said relay is actuated.

2. In an anti-skid system for use with a vehicle where a D.C. generator is provided driven to a speed proportional to the speed of a vehicle wheel, the combination comprising a reference voltage capacitor one terminal of which connects to said generator, rectifier means connecting the generator to the opposite terminal of said reference voltage capacitor for charging current flow thereto, a resistor connecting said reference voltage capacitor to ground, a pair of transistors connected in current amplifying relation and having a base of one transistor connected to said reference voltage capacitor, a D.C. power supply, means connecting the emitter of the other of said transistors to ground, a relay connected to the collector of said other transistor for actuation when a predetermined current flows through said transistor, a solenoid valve, means connecting a power circuit to said solenoid valve when said relay is actuated, and means connected to said resistor ground circuit to open it when said relay is actuated.

3. In an anti-skid system for use with a vehicle where a D.C. generator is provided driven to a speed proportional to the speed of a vehicle wheel, the combination comprising a filter capacitor connected across the D.C. generator, a reference voltage capacitor one terminal of which connects to said generator, a sensitivity resistor connecting said reference voltage capacitor to ground, a pair of transistors connected in series and to said sensitivity resistor, a second resistance connected to said reference voltage capacitor, a relay controlled contact connected to an output lead of said second resistor to normally connect it to ground, a relay connected to an output lead of one of said transistors for actuation when a predetermined current flows through such transistor, said relay when actuated opening the ground circuit of said second resistance, a solenoid valve having an operating coil, and means connecting a power circuit to said operating coil of said solenoid valve when said relay is actuated.

4. In an anti-skid system for use with a vehicle where a D.C. generator is provided driven at a speed proportional to the speed of a vehicle wheel, the combination comprising a filter capacitor connected across the D.C. generator, a reference voltage capacitor one terminal of which connects to said generator, a rectifier connected to the opposite capacitor and to the opposite terminal of said generator, a pair of sensitivity resistors connected between said opposite terminal of said reference voltage capacitor and ground, a pair of transistors connected in series across one of said sensitivity resistors to measure and be actuated by a predetermined voltage drop thereacross, a solenoid valve having an operating coil and connected in and controlling the brake pressure circuit, a relay connected to and controlling the energization circuit for the operating coil for said solenoid valve, and means connecting said relay to a power supply and to one of said transistors to actuate said relay as the voltage output of said generator decreases and said reference voltage capacitor discharges through said one sensitivity resistor and the predetermined voltage is set up thereacross.

5. In an anti-skid system for use with a vehicle where a D.C. generator is provided driven at a speed proportional to the speed of a vehicle wheel, the combination comprising a reference voltage capacitor one terminal of which connects to the D.C. generator, a resistor connecting the other terminal of said reference voltage capacitor to ground to leak electrical energy thereto under no-skid braking conditions, transistor means having a terminal thereof connected to said reference voltage capacitor to control currents flowing through said transistor means, a D.C. power supply, a relay connected to another terminal of said transistor means and to said power supply for actuation when a predetermined current flows through said transistor, electrically controlled valve means controlling a pressure liquid braking circuit and having a brake operative and a brake release position, and contact means controlled by said relay, said contact means being connected in the ground circuit of said resistor and being movable by said relay when actuated to open said resistor ground circuit and to close a circuit for operation of said valve means to set it at brake release position.

6. In an anti-skid system for use with a vehicle where a D.C. generator is provided driven at a speed proportional to the speed of a vehicle wheel, the combination comprising a reference voltage capacitor one terminal of which connects to the negative terminal of the D.C. generator, rectifier means connected between the positive terminal of the D.C. generator and the opposite terminal of said reference voltage capacitor for current flow substantially only in the direction as to charge said reference voltage capacitor, a resistor connecting the opposite terminal of said reference voltage capacitor to ground to leak electrical energy thereto under no-skid braking conditions, transistor means having a terminal thereof connected to said reference voltage capacitor to control currents flowing through said transistor means, means connecting one terminal of said transistor means to ground, a D.C. power supply, a relay connected to said power supply and to a third terminal of said transistor means to complete a circuit therethrough for actuation of said relay when a predetermined current flows through said transistor, electrically controlled valve means controlling a pressure liquid braking circuit and having a brake operative and a brake release position, said valve means normally being in a brake operative position, and contact means controlled by said relay, said contact means being connected in the ground circuit of said resistor and being movable by said relay when actuated to open said resistor ground circuit and to close a grounded power circuit for operation of said valve means to set it at brake release position.

7. In an anti-skid system for use with a vehicle where a D.C. generator is provided driven at a speed proportional to the speed of a vehicle wheel, the combination comprising a reference voltage capacitor one terminal of which connects to said generator, a resistor connecting the other terminal of said reference voltage capacitor to ground to leak electrical energy thereto under no-skid braking conditions, transistor means having one terminal thereof connected to said reference voltage capacitor, a relay connected in series in a power circuit and to a terminal of said transistor means for actuation when a predetermined current flows through said transistor means, a solenoid valve having an operating coil, contact means controlled by said relay, said contact means being connected in the ground circuit of said resistor and being movable by said relay when actuated to open said resistor ground circuit and to close a ground circuit to said solenoid valve operating coil, and power supply circuit means connected to said solenoid valve operating coil to close a circuit therethrough for energization of said solenoid valve when said relay is actuated.

8. An anti-skid system as in claim 7 where said transistor means comprises several transistors connected in current amplifying relation and where the base of one transistor connects to said reference voltage capacitor, and the emitter of said one transistor connects to the base of a second of said transistors, and the collector of said second transistor connects to said relay.

9. In an anti-skid system as in claim 5 for use with an aircraft having a support strut, a second relay having a second set of contact means controlled thereby, a normally open switch controlled by the strut and closed by application of load thereto, circuit means connecting said power supply to said second relay to actuate it when said normally open switch is closed, and connecting means connected to said second set of contact means and to said reference voltage capacitor to connect said power supply thereto for actuation of said first-named relay when said second relay is in its non-energized position to set said valve means at its brake release position.

10. In an anti-skid system as in claim 2 for use with an aircraft having a support strut, a second relay having contact means controlled thereby, a normally open switch controlled by said strut and closed by application of load thereto, circuit means connecting said power supply to said second relay to actuate it when said normally open switch is closed, and connecting means connected to said contact means and to said reference voltage capacitor to connect said power supply to the opposite terminal thereof for actuation of said first-named relay when said second relay is in its non-energized position to actuate said solenoid valve at such condition.

11. In an anti-skid system as in claim 6, means for operating said valve means and comprising a first and a second control relay each having contact means, said contact means of said first control relay connecting said power supply to said second control relay when said first control relay is non-energized to energize said second control relay, said contact means of said second control relay connecting said power supply to said valve means to permit it to be actuated and moved to brake release position when said second control relay is energized.

12. Apparatus as in claim 11 where circuit means connect said contact means of said second control relay to the ground circuit of said valve means, said contact means of said second control relay being directly connected to said power supply after actuation of said second control relay to maintain itself energized but to be deenergized upon closing the ground circuit of said valve means, said contact means of said relay being closed to connect the ground circuit for said valve means thereto and to open the ground circuit of said resistor when said relay means is actuated.

13. In an anti-skid system as in claim 6, means for controlling the actuation of said valve means and comprising a second control relay having contact means, means for energizing said second control relay, said contact means of said second control relay connecting said power supply to said valve means to enable it to be energized to move to brake release position when said second control relay is energized, circuit means connecting said contact means of said second control relay to the ground circuit of said valve means, said ground circuit for said valve means being directly connected thereto but remaining open until actuation of said relay, said contact means of said second control relay being connected to said power supply after actuation of said second control relay to maintain itself energized but to be de-energized upon closing the ground circuit of said valve means.

14. In an anti-skid system as in claim 13, a grounded condenser connected in parallel with the operating coil of said second control relay, and a resistance connected in series with said grounded condenser whereby said grounded condenser slowly leaks its charge and said second control relay is released to open the energization circuit of said valve means a predetermined interval after de-energization of the power supply circuit of said second control relay whereby brake action then can be obtained.

15. An anti-skid system as in claim 11 where a manually controlled switch is provided in the power supply circuit, and said second control relay can be energized by turning said switch off and then on.

References Cited in the file of this patent
UNITED STATES PATENTS

| | | |
|---|---|---|
| 2,838,657 | Wilcox | June 10, 1958 |
| 2,850,121 | Curl et al. | Sept. 2, 1958 |